(12) United States Patent
Schultz et al.

(10) Patent No.: US 11,029,291 B2
(45) Date of Patent: Jun. 8, 2021

(54) SYSTEMS AND METHODS FOR IONIZATION

(71) Applicant: Thermo Finnigan LLC, San Jose, CA (US)

(72) Inventors: Gary A. Schultz, Ithaca, NY (US); R. Paul Atherton, San Jose, CA (US); Eloy R. Wouters, San Jose, CA (US)

(73) Assignee: Thermo Finnigan LLC, San Jose, CA (US)

(*) Notice: Subject to any disclaimer, the term of this patent is extended or adjusted under 35 U.S.C. 154(b) by 0 days.

(21) Appl. No.: 16/925,514

(22) Filed: Jul. 10, 2020

(65) Prior Publication Data

US 2020/0340959 A1 Oct. 29, 2020

Related U.S. Application Data

(62) Division of application No. 14/935,782, filed on Nov. 9, 2015, now Pat. No. 10,718,745.

(51) Int. Cl.
  *G01N 30/72* (2006.01)
  *H01J 49/16* (2006.01)

(52) U.S. Cl.
  CPC ........ *G01N 30/7266* (2013.01); *H01J 49/165* (2013.01)

(58) Field of Classification Search
  CPC ........................... G01N 30/7266; H01J 49/165
  See application file for complete search history.

(56) References Cited

U.S. PATENT DOCUMENTS

| 5,505,832 A | 4/1996 | Laukien et al. |
| 6,350,609 B1 * | 2/2002 | Morozov ............. B01J 19/0046 506/16 |
| 6,607,921 B1 | 8/2003 | Hindsgaul et al. |

(Continued)

FOREIGN PATENT DOCUMENTS

| WO | 99/56304 A2 | 11/1999 |
| WO | 2015/019159 A1 | 2/2015 |

OTHER PUBLICATIONS

Ficarro, et al., "Improved Electrospray Ionization Efficiency Compensates for Diminished Chromatographic Resolution and Enables Proteomics Analysis of Tyrosine Signaling in Embryonic Stem Cells"; Anal Chem 2009, vol. 81 (9), pp. 3440-3447.

(Continued)

*Primary Examiner* — Xin Y Zhong
(74) *Attorney, Agent, or Firm* — David A. Schell

(57) ABSTRACT

A system for analyzing a sample includes a chromatographic device, an electrospray source, and a mass resolving device. The chromatographic device is configured to separate components of the sample as a function of retention time within a chromatographic column. The electrospray source is configured to direct a first portion of a flow from the chromatographic device via a waste outlet to a pressurized waste reservoir, direct a second portion of the flow to an electrospray ionization outlet to form a spray, and charge and desolvate the spray to form ions of the components of the sample. A flow rate of the second portion of the liquid flow is substantially determined by a pressure of the pressurized waste reservoir. The mass resolving device configured to receive the ions and characterize the mass-to-charge ratio of the ions.

22 Claims, 8 Drawing Sheets

(56) References Cited

U.S. PATENT DOCUMENTS

| | | |
|---|---|---|
| 6,627,882 B2 | 9/2003 | Schultz et al. |
| 2002/0112959 A1 | 8/2002 | Xue et al. |
| 2003/0034407 A1* | 2/2003 | Gangl .................. G01N 30/10 |
| | | 239/690 |
| 2005/0258360 A1* | 11/2005 | Whitehouse ........... B01D 61/00 |
| | | 250/288 |
| 2008/0047330 A1 | 2/2008 | Whitehouse et al. |
| 2008/0314129 A1* | 12/2008 | Schultz ................. G01N 30/80 |
| | | 73/61.55 |
| 2013/0327936 A1 | 12/2013 | Ramsey et al. |
| 2016/0003787 A1 | 1/2016 | Wright et al. |
| 2017/0110307 A1* | 4/2017 | Mellors ............. G01N 27/4473 |

OTHER PUBLICATIONS

Foret et al., "Subatmospheric electrospray interface for coupling of microcolumn separations with mass spectrometry", Electrophoresis 2000, 21, pp. 1363-1371.

Schmidt, et al., "Effect of different solution flow rates on analyte ion signals in nano-ESI MS, or: when does ESI turn into nano-ESI?", J Am Soc Mass Spectrom 2003, vol. 14 (5), pp. 492-500.

* cited by examiner

SYSTEMS AND METHODS FOR IONIZATION

CROSS-REFERENCE TO RELATED APPLICATION

This application is a divisional under 35 U.S.C. § 121 and claims the priority benefit of co-pending U.S. patent application Ser. No. 14/935,782, filed Nov. 9, 2015. The disclosure of the foregoing application is incorporated herein by reference.

FIELD

The present disclosure generally relates to the field of mass spectrometry including systems and methods for ionization.

INTRODUCTION

Liquid Chromatography Mass Spectrometry (LC-MS) combines liquid chromatography (LC), such as High Performance Liquid Chromatography (HPLC) and Ultrahigh Performance Liquid Chromatography (UHPLC), for separation of analytes in a sample with Mass Spectrometry (MS) to detect, quantify, and identify the analytes. Generally, the effluent from the HPLC or UHPLC is directed into the source of the mass spectrometer where the analytes are ionized and the ions analyzed to determine the mass of the analytes and fragments thereof. However, at analytical LC flow rates (typically about 100 microliter per minute (µL/min) to about 1000 µL/min or more), there can be significant signal variability, especially at low concentrations of analytes. Ionization techniques, such as electrospray ionization, can form charged droplets which are then desolvated in a gas flow. At analytical flow rates, the required gas flow to desolvate the droplets can be significant (typically about 5 L/min to about 10 L/min or more). Turbulence in the gas flow or disruptions in the droplet formation are some of the potential sources for the signal variability, particularly when monitoring specific ions for periods of time less than 20 milliseconds.

From the foregoing it will be appreciated that a need exists for improved ion sources.

SUMMARY

In a first aspect, a system for analyzing a sample can include an electrospray source and a mass resolving device. The electrospray source can be configured to direct a first portion of a flow from a chromatographic device via a waste outlet to a pressurized waste reservoir, direct a second portion of the flow to an electrospray ionization outlet to form a spray, and charge and desolvate the spray to form ions of the components of the sample. A flow rate of the second portion of the liquid flow can be substantially determined by a pressure of the pressurized waste reservoir. The mass resolving device can be configured to receive the ions, and characterize the mass-to-charge ratio of the ions.

In various embodiments of the first aspect, the system can include a chromatographic device configured to separate components of the sample as a function of retention time within a chromatographic column.

In various embodiments of the first aspect, the electrospray ionization outlet can include at least one electrospray emitter. In particular embodiments, the electrospray emitter includes a platinum wire to provide a high voltage to the second portion of the flow at the electrospray emitter.

In particular embodiments, the at least one electrospray emitter can include an array of electrospray emitters. In particular embodiments, the array of electrospray emitters can include at least about 5 electrospray emitters. In particular embodiments, the array of electrospray emitters includes not greater than about 1000 emitters. In particular embodiments, the array of electrospray emitters includes not greater than about 500 emitters.

In particular embodiments, an electric field strength at the at least one electrospray emitter is between about $2\times10^7$ V/m and about $2\times10^{10}$ V/m.

In various embodiments of the first aspect, the electrospray ionization outlet can include a counter electrode.

In various embodiments of the first aspect, the electrospray source can be configured to provide a nebulization gas at the electrospray ionization outlet. In particular embodiments, the nebulization gas can have a pressure of between about 1 psi and about 5 psi.

In various embodiments of the first aspect, a split ratio of the second flow to the first flow can be between about 1:1 to about 1:2000. In particular embodiments, the split ratio can be between about 1:50 to about 1:1000.

In various embodiments of the first aspect, the flow rate of the second portion can be between about 10 nanoliter per minute (nL/min) to about 25 µL/min per emitter nozzle.

In various embodiments of the first aspect, the pressure of the pressurized waste container can be between about 2 psi and about 50 psi.

In a second aspect, an electrospray source can include an inlet for receiving a liquid flow from a liquid chromatography column, a waste outlet for directing a first portion of the liquid flow to a pressurized waste reservoir, and an electrospray ionization outlet. The electrospray ionization outlet can be configured to generate ions from a second portion of the liquid flow. A flow rate of the second portion of the liquid flow can be substantially determined by a pressure of the pressurized waste reservoir.

In various embodiments of the second aspect, the electrospray ionization outlet can include at least one electrospray emitter. In particular embodiments, the electrospray emitter can include a platinum wire to provide a high voltage to the second portion of the flow at the electrospray emitter.

In particular embodiments, the at least one electrospray emitter can include an array of electrospray emitters. In particular embodiments, the array of electrospray emitters can include at least about 5 electrospray emitters. In particular embodiments, the array of electrospray emitters can include not greater than about 1000 emitters. In particular embodiments, the array of electrospray emitters can include not greater than about 500 emitters.

In particular embodiments, an electric field strength at the at least one electrospray emitter can be between about $2\times10^7$ V/m and about $2\times10^{10}$ V/m.

In various embodiments of the second aspect, the electrospray ionization outlet can include a counter electrode.

In various embodiments of the second aspect, the electrospray source can be configured to provide a nebulization gas at the electrospray ionization outlet.

In particular embodiments, the nebulization gas can have a pressure of between about 1 psi and about 5 psi.

In various embodiments of the second aspect, a split ratio of the second flow to the first flow can be between about 1:1 to about 1:2000. In particular embodiments, the split ratio can be between about 1:50 to about 1:1000.

In various embodiments of the second aspect, the flow rate of the second portion can be between about 10 nL/min to about 25 μL/min per emitter nozzle.

In various embodiments of the second aspect, the pressure of the pressurized waste container can be between about 2 psi and about 50 psi.

In a third aspect, a method for analyzing a liquid sample can include supplying a flow of a liquid sample to an inlet of a electrospray source, splitting the flow into a first portion directed to a pressurized waste container and a second portion to a electrospray ionization outlet, adjusting a pressure within the pressurized waste container to control a flow rate of the second portion to the electrospray ionization outlet, generating ions of components of the liquid sample at the electrospray ionization outlet, and analyzing the ions using a mass spectrometer to identify the components of the sample.

In various embodiments of the third aspect, the method can further include providing a high voltage to the second portion of the flow at the electrospray emitter.

In various embodiments of the third aspect, the electrospray ionization outlet can include at least one electrospray emitter. In particular embodiments, the electrospray emitter can include a platinum wire.

In particular embodiments, the at least one electrospray emitter can include an array of electrospray emitters. In particular embodiments, the array of electrospray emitters can include at least about 5 electrospray emitters. In particular embodiments, the array of electrospray emitters can include not greater than about 1000 emitters. In particular embodiments, the array of electrospray emitters can include not greater than about 500 emitters.

In particular embodiments, the method can further include generating an electric field having an electric field strength at the at least one electrospray emitter of between about $2 \times 10^7$ V/m and about $2 \times 10^{10}$ V/m.

In various embodiments of the third aspect, the electrospray ionization outlet can include a counter electrode.

In various embodiments of the third aspect, the method can further include providing a nebulization gas at the electrospray ionization outlet. In particular embodiments, the nebulization gas can be provided at a pressure of between about 1 psi and about 5 psi.

In various embodiments of the third aspect, a split ratio of the second flow to the first flow can be between about 1:1 to about 1:2000. In particular embodiments, the split ratio can be between about 1:50 to about 1:1000.

In various embodiments of the third aspect, the flow rate of the second portion can be between about 10 nL/min to about 25 μL/min.

In various embodiments of the third aspect, the pressure within the pressurized waste container can be between about 2 psi and about 50 psi.

DRAWINGS

For a more complete understanding of the principles disclosed herein, and the advantages thereof, reference is now made to the following descriptions taken in conjunction with the accompanying drawings, in which:

FIG. 2A is a cross section view and FIG. 2B is a perspective view.

FIG. 7A is a cross section view and FIG. 7B is a perspective view.

Figure 1:
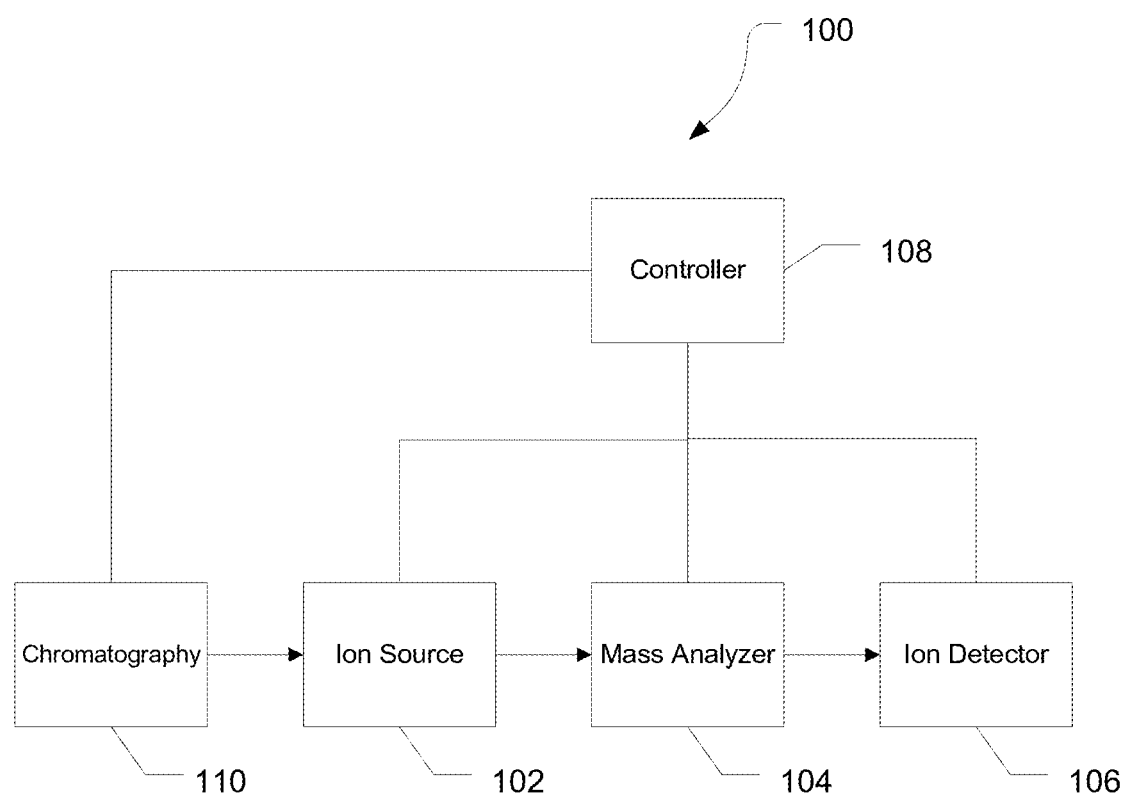
FIG. 1 is a block diagram of an exemplary mass spectrometry system, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ionization are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 104, an ion detector 106, and a controller 108.

In various embodiments, the ion source 102 generates a plurality of ions from a sample. The ion source can include, but is not limited to, a matrix assisted laser desorption/ionization (MALDI) source, electrospray ionization (ESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the mass analyzer 104 can separate and characterize ions based on a mass-to-charge ratio of the ions. These ions can carry one or more charges. For example, the mass analyzer 104 can include a quadrupole mass filter analyzer, a quadrupole ion trap analyzer, a time-of-flight (TOF) analyzer, an electrostatic trap (e.g., Orbitrap) mass analyzer, Fourier transform ion cyclotron resonance (FT-ICR) mass analyzer, and the like. In various embodiments, the mass analyzer 104 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 106 can detect ions. For example, the ion detector 106 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 108 can communicate with the ion source 102, the mass analyzer 104, and the ion detector 106. For example, the controller 108 can configure the ion source or enable/disable the ion source. Additionally, the controller 108 can configure the mass analyzer 104 to select a particular mass range to detect. Further, the controller 108 can adjust the sensitivity of the ion detector 106, such as by adjusting the gain. Additionally, the controller 108 can adjust the polarity of the ion detector 106 based on the polarity of the ions being detected. For example, the ion detector 106 can be configured to detect positive ions or be configured to detected negative ions.

In various embodiments, the system can be coupled with a chromatography device 110. The chromatography device 110 can include a gas chromatograph (GC), a liquid chromatograph (LC), such as an HPLC or a UHPLC, or the like. The chromatography device can separate components of a sample according to the retention times of the individual components within the column. In various embodiments, the chromatography column can include a material that interacts with at least some of the components of the sample. The interactions between the components and the column material can retard the flow of the components through the column, resulting in a retention time that is a function of the extent of the interaction between the component and the column material. The interactions can be based on a size of the component, a hydrophobicity of the component, the charge of the component, an affinity of the column material for the component, or the like. As such, the column can at least partially separate components of the sample from one another.

Ion Source

Figure 2A:
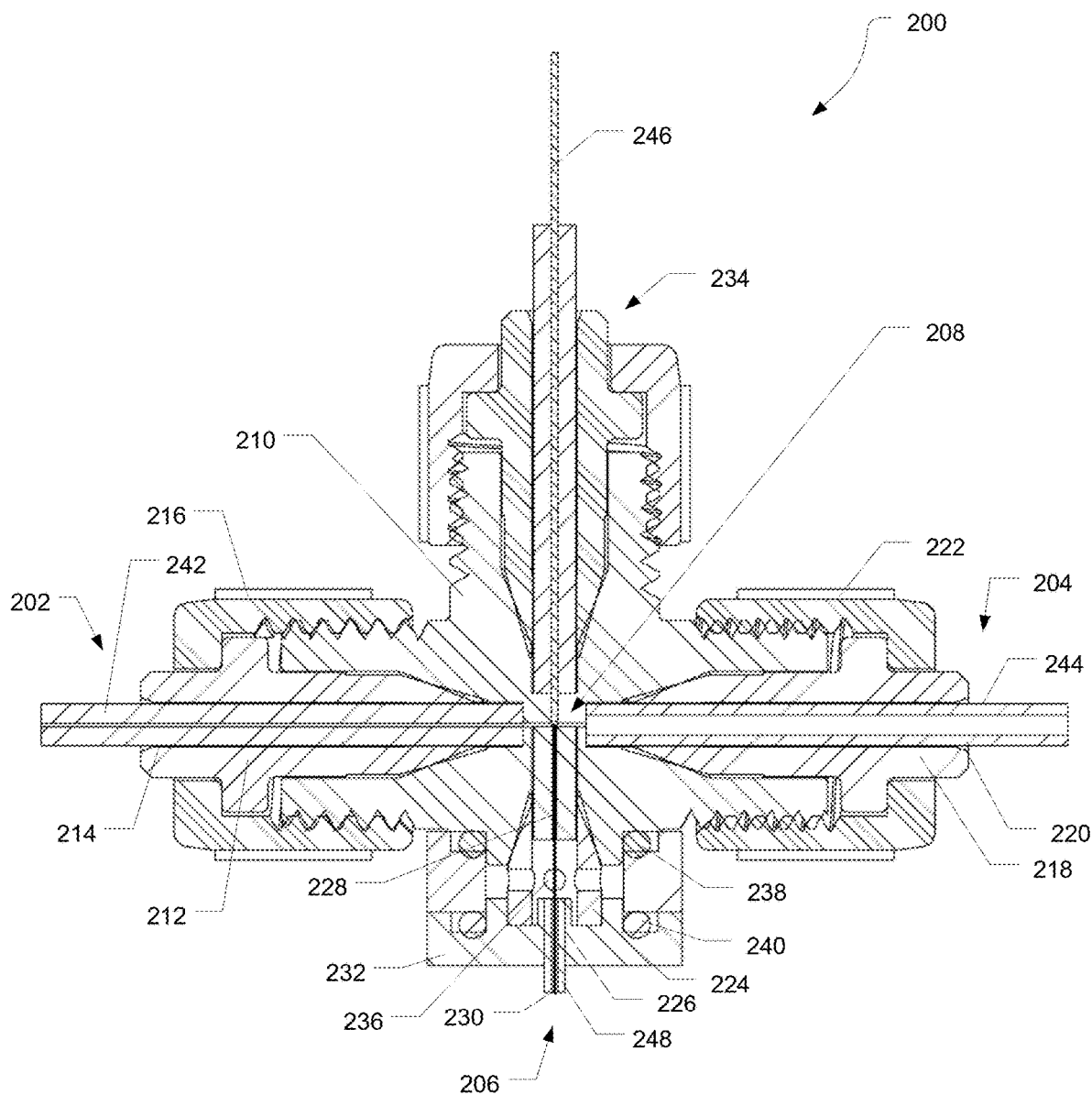
FIGS. 2A and 2B are diagrams illustrating an exemplary electrospray source, in accordance with various embodiments.
Figure 2B:
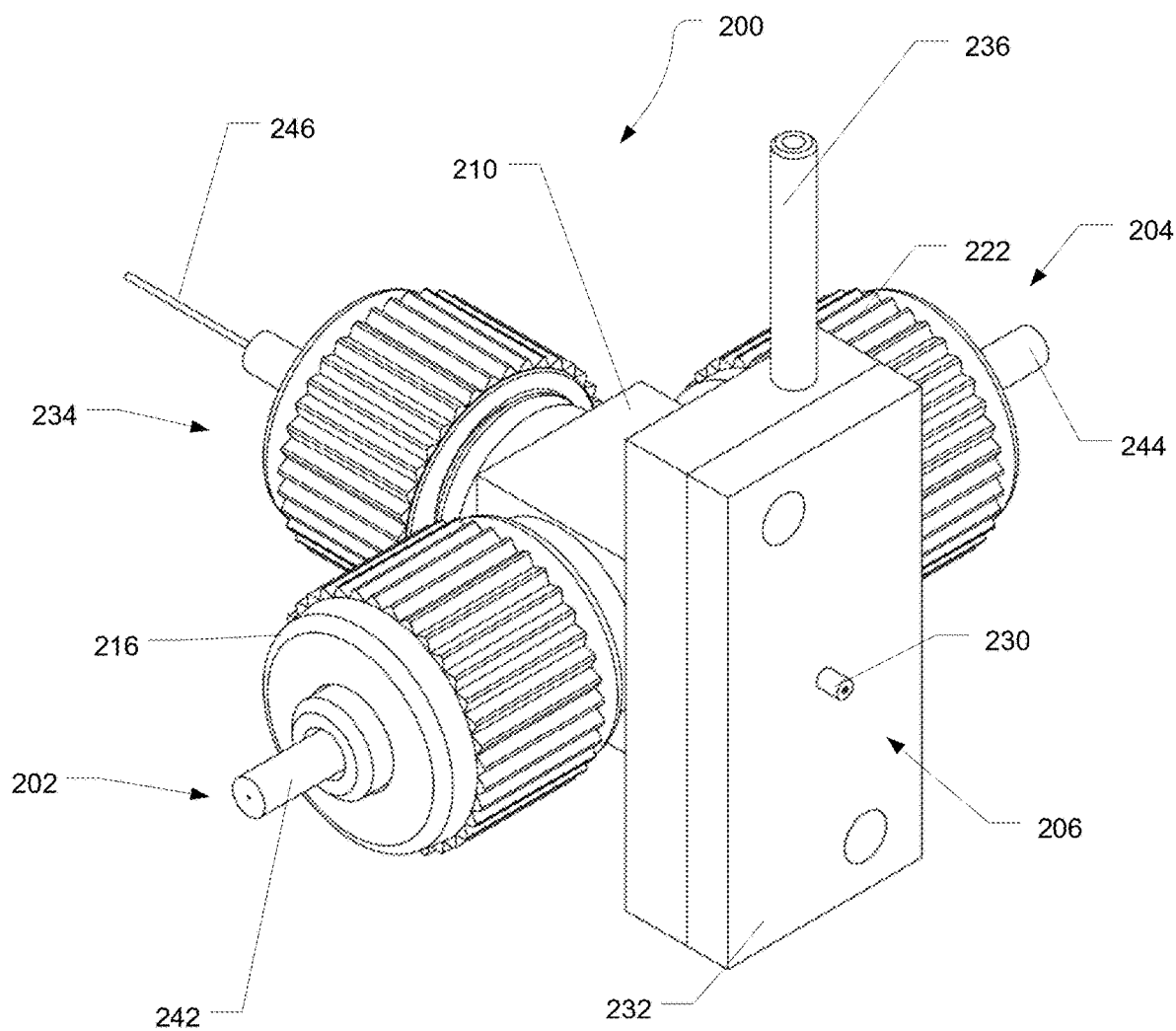

FIGS. 2A and 2B illustrate of an exemplary electrospray source 200. FIG. 2A is a cross-section view and FIG. 2B is a perspective view. The electrospray source 200 can include a LC effluent inlet 202, a waste outlet 204, and an electrospray outlet 206 connected at a T-junction 208 housed within a body 210. In various embodiments, the T-junction 208 can be formed of or lined with fused silica.

In various embodiments, effluent from an LC column can be directed to the LC effluent inlet 202, where, from the T junction 208, a first portion can be directed to the waste outlet 204 and to a pressurized waste container and a second portion can be directed to the ionization outlet 206 where ions for MS analysis can be formed. The amount of effluent sent to the ionization outlet 206 can be a function of the pressure in the pressurized waste container. In various embodiments, the waste container can be pressurized to between about 2 psi and about 50 psi, although other pressures are possible. In various embodiments, the resulting second portion of the effluent flow that is sent to the ionization outlet can be between about 10 nL/min to about 25 µL/min per emitter. In various embodiments with multiple emitters, the total flow rate of the second portion can be, for example, up to about 12.5 mL/min for an array of 500 emitters.

In various embodiments, the resultant ratio between the second portion (to the ionization outlet) and the first portion (to the waste container) can be between about 1:50 to about 1:2000, such as between about 1:100 to about 1:1000. In certain embodiments with multiple electrospray emitters, a much higher fraction or even the entire effluent flow can be directed to the ionization outlets.

The LC effluent inlet 202 can include an inlet ferrule 212 having a LC effluent tubing channel 214 formed there through. Additionally, the LC effluent inlet 202 can include a ferrule nut 216. In various embodiments, LC effluent tubing 242 can be positioned within the LC effluent tubing channel 214 of the inlet ferrule 212 and the ferrule nut 216 can couple the inlet ferrule 212 to the body 210 to form a liquid tight union between effluent tubing and the T-junction 208.

The waste outlet 204 can include a waste ferrule 218 having a waste tubing channel 220 formed there through. Additionally, the waste inlet 204 can include a ferrule nut 222. In various embodiments, waste tubing 244, coupled to the pressurized waste container, can be positioned within the waste tubing channel 220 of the waste ferrule 218 and the ferrule nut 222 can couple the waste ferrule 218 to the body 210 to form a liquid tight union between the waste tubing and the T-junction 208.

The ionization outlet 206 can include an ionization ferrule 224 having a channel 226 formed there through. In various embodiments, a fused silica tubing 228 can be inserted through the channel 226. Alternatively, the channel 226 can be lined with fused silica or other inert material. In various embodiments, the ionization outlet 206 can include one or more electrospray emitters 230 and a counter electrode 232. In various embodiments, a portion of the effluent can be directed from the T-junction 208 down the channel 226 to the electrospray emitter 230. In various embodiments, a voltage can be applied the counter electrode 232 to drive droplets and ions away from the electrospray emitters 230 as or after they are formed.

In various embodiments, the electrospray emitter 230 can include a single emitter. Alternatively, the electrospray emitters 230 can include be arranged as an array of electrospray emitters 230, such as by an electrospray chip. In particular embodiments, the multi-channel array can include at least about 5 electrospray emitters and generally not more than about 1000 electrospray emitters, such as not more than about 500 electrospray emitters. In various embodiments, at the electrospray emitter 230, a Taylor cone can be formed by applying a high voltage. The Taylor cone can generate a fine spray of charged droplets of the effluent, which, after evaporation, can generate gas phase ions of the components of the sample for mass spectrometry analysis.

In various embodiments, the high voltage can be applied by a high voltage connection 234 and a metal wire 246, such as a platinum wire, inserted into the T-junction 208 where comes into contact with the liquid flowing along channel 226 to the electrospray emitter 230. In alternate embodiments, the high voltage can be applied to the electrospray emitter 230, such as when using an electrospray chip with multiple electrospray emitters 230, in other ways without passing through the T-junction 208. Alternatively, the body 210 could be constructed from metal, which would eliminate the need for a fourth port 234. In various embodiments, the electric field at the electrospray emitter 230 can preferentially be between about $2\times10^7$ V/m and about $2\times10^{10}$ V/m. The electric field can be produced by the voltages applied to the counter electrode and the emitter, and the strength can be a function of the difference between the voltage applied to the counter electrode and the voltage applied to the emitter.

In various embodiments, a sheath or nebulization gas can be supplied to the electrospray emitter 230 to enhance the electrospray at higher flow rates and improve desolvation of the droplets. The gas can be supplied through gas inlet 236 and directed around to the electrospray emitter 230 and within a tube 248 circumscribing the electrospray emitter 230 by the electrospray ionization ferrule 224. O-rings 238 and 240 can be utilized to create a gas tight seal within the ionization outlet 206. In various embodiments, the nebulization gas, when supplied, can have a pressure of between about 0.1 psi and about 15 psi, such as between about 1.0 psi and about 5.0 psi. As is understood in the art, drying and counter current gases can be supplied to enhance desolvation of the droplets.

Figure 7A:
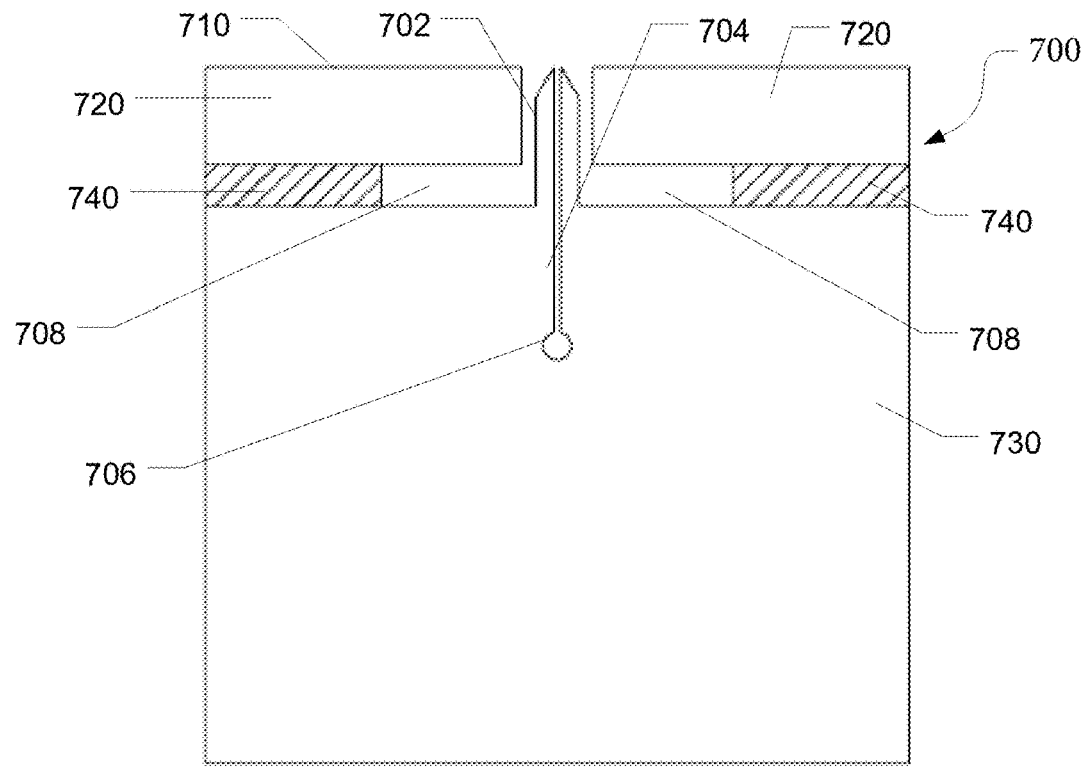
FIGS. 7A and 7B are diagrams illustrating an exemplary electrospray emitter array, in accordance with various embodiments.
Figure 7B:
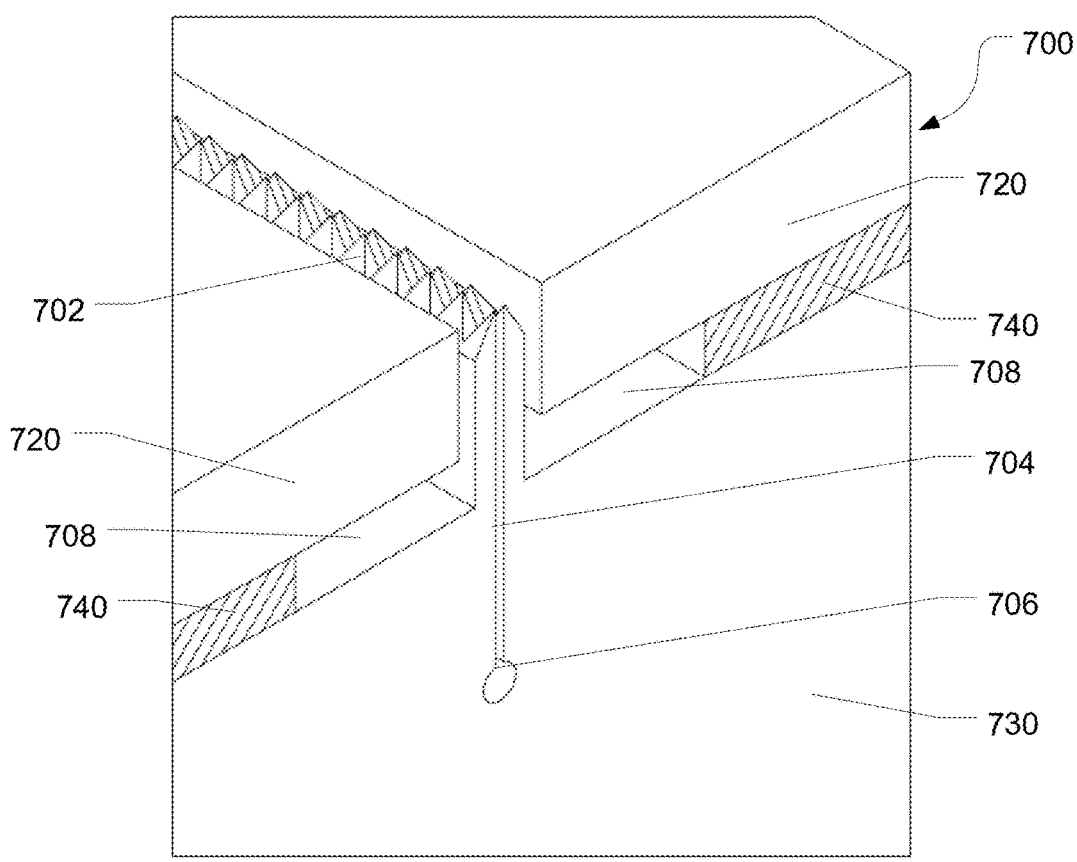

FIGS. 7A and 7B illustrate of an exemplary emitter array 700. FIG. 7A is a cross-section view and FIG. 7B is a perspective view. Emitter array 700 can include a plurality of emitters 702 having an emitter channel 704 formed therein. The emitter channel 704 can connect to effluent distribution channel 706 that can distribute the second portion of the effluent to the emitters 702 of the emitter array 700. In various embodiments, emitter channel 704 can be formed as a slit across the emitters 702 of the array, such that a single channel is formed. Alternatively, each emitter 702 can have a separated emitter channel 704 connected to the effluent distribution channel 706 and not in fluidic communication with the adjacent emitter channels 704 except through the effluent distribution channel 706.

Additionally, emitter array 700 can include a sheath gas channel 708 for the distribution of a sheath gas flow adjacent to the emitters 702. In various embodiments, the surface 710 on the emitter array 700 can act as a counter electrode by applying a different high voltage potential to the surface 710 and the emitters 702, provided the surface 710 and the emitters 702 are electrically isolated, such as with a dielectric material, other material, or a physical gap. In various embodiments, the emitter array 700 can be formed with a top layer 720 formed of a conductive material and a bottom layer 730 formed of a conductive material with a layer of dielectric material 740 between the top and bottom layers so as to provide electrical isolation of the surface 710 from the emitters 702. In other embodiments, the emitter array 700 can be formed of a non-conductive or dielectric material and the surface 710 and the emitters 702 can be coated with a conductive layer.

Figure 3:
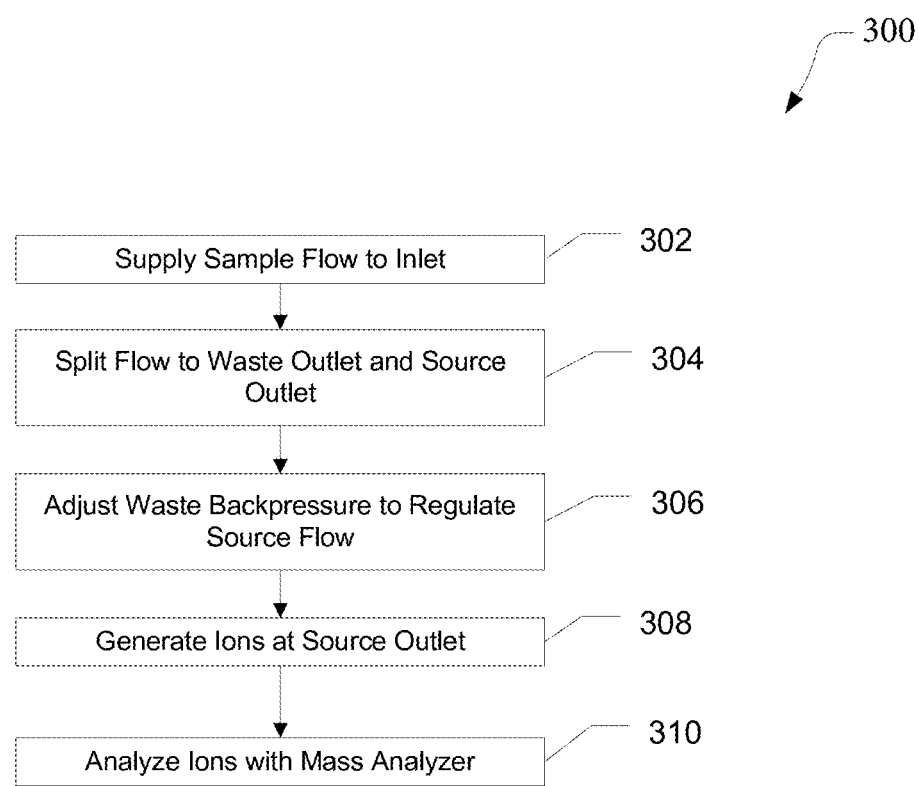
FIG. 3 is a flow diagram of an exemplary method for generating ions for mass analysis, in accordance with various embodiments.

FIG. 3 is a flow diagram illustrating an exemplary method 300 of analyzing a sample using a LC-MS system with an electrospray source, such as electrospray source 200 of FIG. 2.

At 302, a sample flow, such as an effluent from an LC system can be supplied to an inlet of an electrospray source, such as LC inlet 202 of FIG. 2. In various embodiments, the sample flow can include a plurality of components of a sample that have been separated as a function of time by the LC system, such that a small number of components reach the inlet at a given time.

At 304, the electrospray source can split the flow between a first portion to a waste outlet and a second portion to an ionization outlet. In various embodiments, the ratio between the second portion and the first portion can be between about 1:1 to about 1:2000, such as about 1:50 to about 1:1000. In various embodiments, the resultant second portion can provide between about 1 µL/min to about 25 µL/min per emitter to the ionization outlet. In various embodiments with multiple emitters, the second portion can provide a total flow rate, for example, of between about 500 µL/min to about 12.5 mL/min for an emitter array with 500 emitters.

At 306, the backpressure in the waste outlet can be adjusted to regulate the flow to the ionization outlet. The waste outlet can be directed to a pressurized waste container and the pressure within the waste container can be adjusted to achieve the desired flow to the ionization outlet. In various embodiments, the pressure within the waste contained can be between about 10 psi and about 50 psi.

At 308, the liquid flowing to the ionization outlet can be ionized, such as by electrospray ionization. In various embodiments, one or more electrospray emitters can be arranged at the ionization outlet and a high voltage can be applied to generate an electric field having an electric field strength at the electrospray emitter of between about $2\times10^7$ V/m and about $2\times10^{10}$ V/m. The electrospray emitters can include a single electrospray emitter with a metal wire, such as a platinum wire, an array of electrospray emitters, or other arrangements of electrospray emitters. An array of electrospray emitters can include at least about 5 electrospray emitters, such as not greater than about 1000 electrospray emitters, even not greater than about 500 electrospray emitters.

At 310, a mass analyzer can analyze the ions to determine a mass-to-charge ratio. As is known in the art, additional methods can be performed on the ions, including MS/MS analysis where the ions are fragmented and the mass-to-charge ratios of the resulting ion fragments are determined.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

Results

Figure 4:
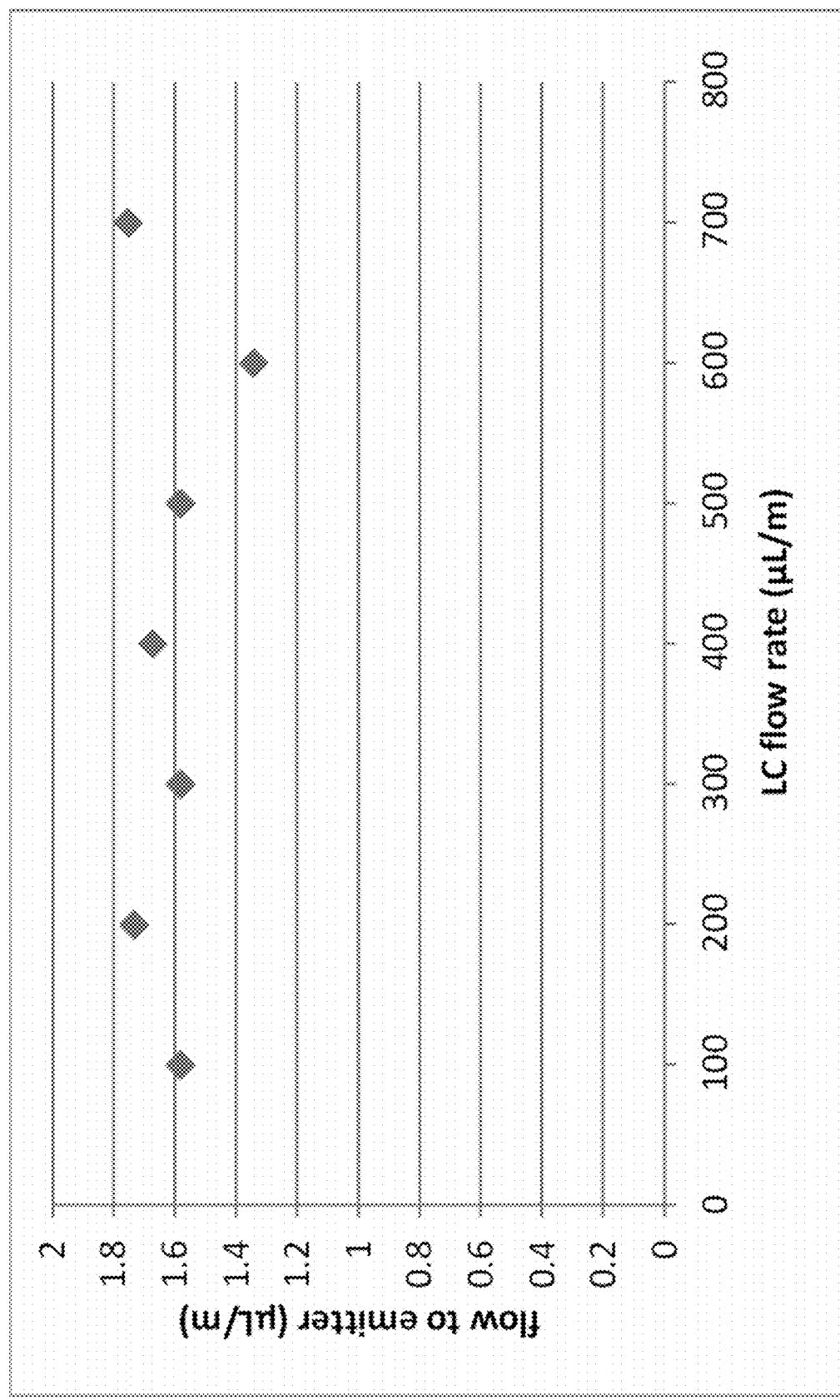
FIG. 4 is a graph showing the flow to the ionization outlet is substantially independent of inlet flow at a fixed back pressure, in accordance with various embodiments.

The flow to an example emitter is measured at various LC flows ranging from 100 µL/min to 700 µL/min with a waste reservoir pressure held fixed at 30 psi. FIG. 4 is a graph showing that the flow to the emitter is substantially independent of the LC flow. As is shown, the flow to the emitter is maintained at about 1.6 µL/min over a range of LC flows of between 100 µL/min and 700 µL/min. In this non-limiting example, the split ratio between the flow to the emitter and that to the waste reservoir ranges between 1:60 and 1:440.

Figure 5:
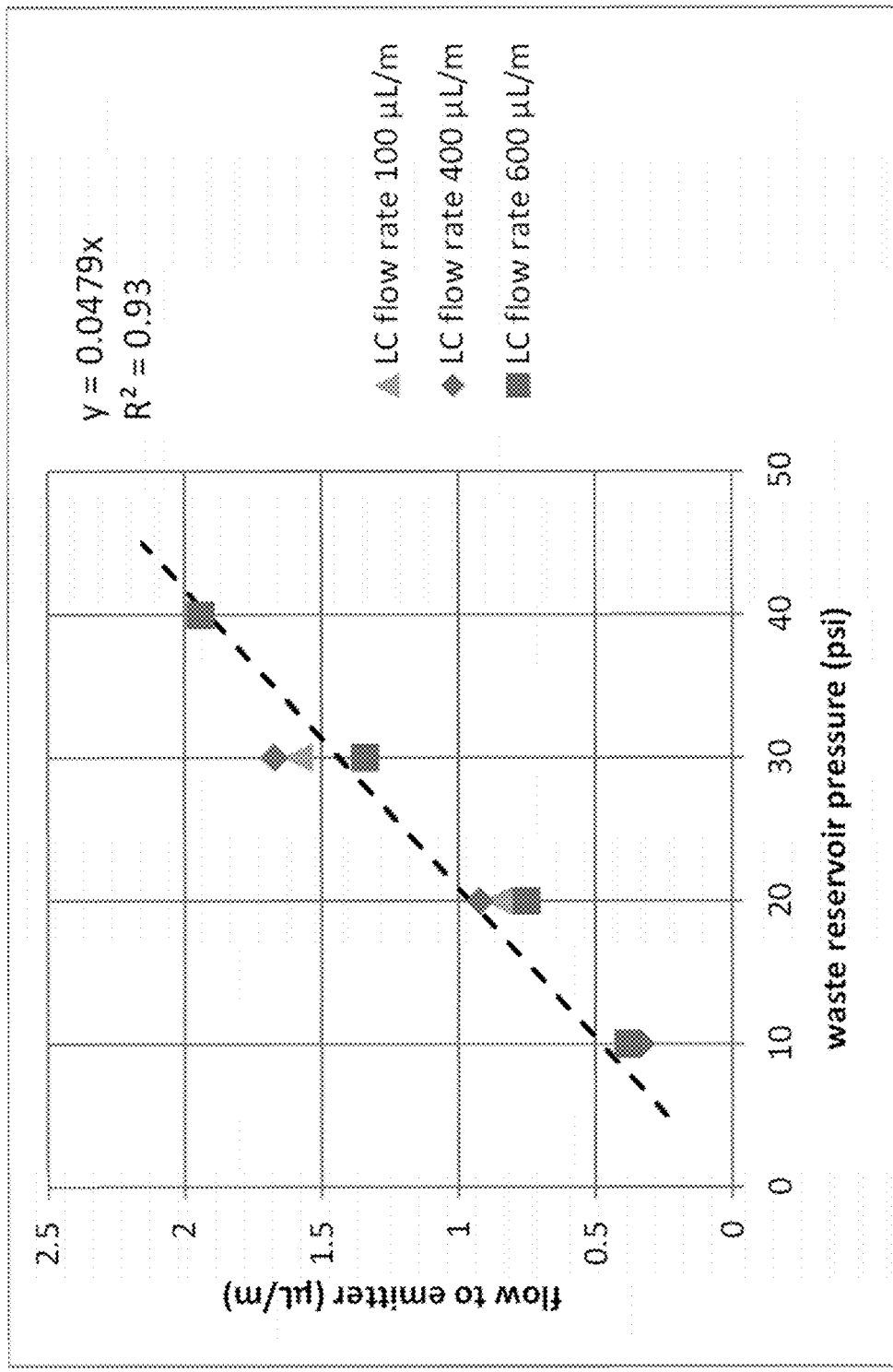
FIG. 5 is a graph showing the flow to the ionization outlet is dependent on back pressure, in accordance with various embodiments.

The flow to the emitter is measured at various LC flows (100 µL/min, 400 µL/min, and 600 µL/min) and various waste reservoir pressure ranging from 10 psi to 40 psi. FIG. 5 is a graph showing the linear dependence of the emitter flow on the reservoir pressure. Additionally, the relationship between the emitter flow and the reservoir pressure is substantially similar across the range of LC flows.

Figure 6:
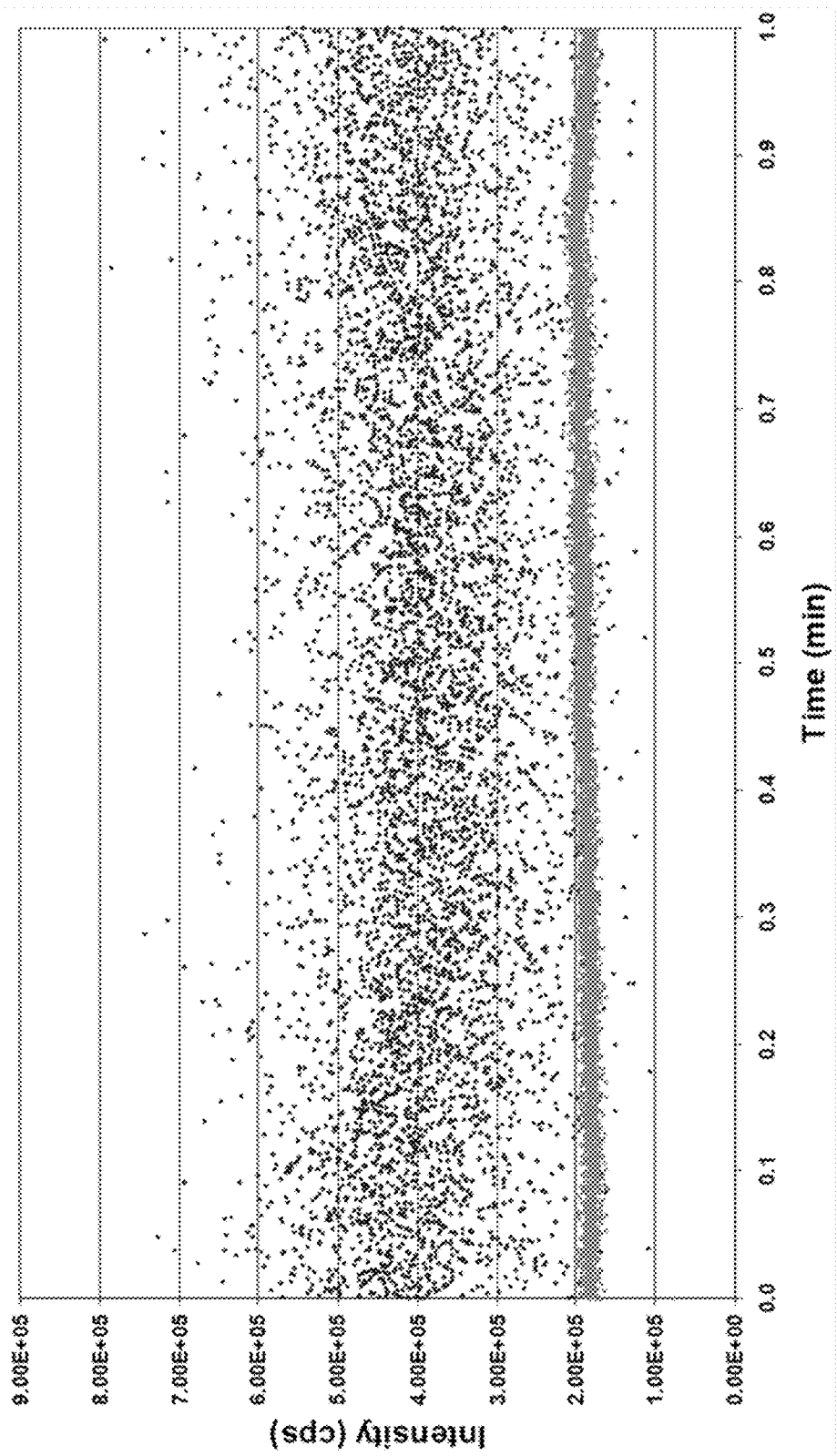
FIG. 6 is a graph showing the uniformity of the ion intensity compared to a traditional high flow source, in accordance with various embodiments.

The stability of the source, as determined by variability in the intensity of ions measured by the ion detector, is compared between a high flow electro spray source and a split electrospray source as described herein. A continuous flow of analyte at a fixed concentration is supplied to the electrospray source and the mass spectrometer is configured to monitor a selected reaction (SRM mode). FIG. 6 shows that the high flow electrospray source exhibits significant variability over time, whereas the variability from the split electrospray source is significantly lower, showing the improved stability of the split electrospray source.

What is claimed is:

1. A system for analyzing a sample comprising:
an electrospray source configured to
direct, at a junction, a first portion of a flow from a chromatographic device via a waste outlet to a pressurized waste reservoir;
direct, at the junction, a second portion of the flow to an electrospray ionization outlet to form a spray, a flow rate of the second portion of the liquid flow is substantially determined by a pressure of the pressurized waste reservoir, wherein the electrospray ionization outlet includes a platinum wire threaded through the junction and at least one electrospray emitter, the platinum wire to provide a voltage to the second portion of the flow at the at least one electrospray emitter; and
charge and desolvate the spray to form ions of the components of the sample;
a mass resolving device configured to:
receive the ions; and
characterize the mass-to-charge ratio of the ions; and
a controller configured to:
adjusting the pressure within the pressurized waste reservoir to control the flow rate of the second portion to the electrospray ionization outlet.

2. The system of claim 1 further comprising a chromatographic device configured to separate components of the sample as a function of retention time within a chromatographic column.

3. The system of claim 1 wherein the at least one electrospray emitter includes an array of electrospray emitters.

4. The system of claim 3 wherein the array of electrospray emitters includes at least about 5 electrospray emitters.

5. The system of claim 4 wherein the array of electrospray emitters includes not greater than about 1000 emitters.

6. The system of claim 1 wherein an electric field strength at the at least one electrospray emitter is between about $2 \times 10^7$ V/m and about $2 \times 10^{10}$ V/m.

7. The system of claim 1 wherein the electrospray ionization outlet includes a counter electrode.

8. The system of claim 1 wherein the electrospray source is configured to provide a nebulization gas at the electrospray ionization outlet.

9. The system of claim 8 wherein the nebulization gas has a pressure of between about 1 psi and about 5 psi.

10. The system of claim 1 wherein a split ratio of the second flow to the first flow is between about 1:1 to about 1:2000.

11. The system of claim 1 wherein the flow rate of the second portion is between about 10 nL/min to about 25 µL/min per emitter nozzle.

12. The system of claim 1 wherein the pressure of the pressurized waste reservoir is between about 2 psi and about 50 psi.

13. An electrospray source comprising:
a junction having:
an inlet for receiving a liquid flow from a liquid chromatography column;
a waste outlet for directing a first portion of the liquid flow to a pressurized waste reservoir; and
an electrospray ionization outlet configured to generate ions from a second portion of the liquid flow, a flow rate of the second portion of the liquid flow is substantially determined by a pressure of the pressurized waste reservoir, wherein the electrospray ionization outlet includes at least one platinum wire and at least one electrospray emitter, the platinum wire inserted through the junction to the electrospray emitter to provide a voltage to the second portion of the flow at the electrospray emitter.

14. The electrospray source of claim 13 wherein the at least one electrospray emitter includes an array of electrospray emitters.

15. The electrospray source of claim 14 wherein the array of electrospray emitters includes at least about 5 electrospray emitters.

16. The electrospray source of claim 15 wherein the array of electrospray emitters includes not greater than about 1000 emitters.

17. The electrospray source of claim 13 wherein an electric field strength at the at least one electrospray emitter is between about $2 \times 10^7$ V/m and about $2 \times 10^{10}$ V/m.

18. The electrospray source of claim 13 wherein the electrospray source is configured to provide a nebulization gas at the electrospray ionization outlet.

19. The electrospray source of claim 18 wherein the nebulization gas has a pressure of between about 1 psi and about 5 psi.

20. The electrospray source of claim 13 wherein a split ratio of the second flow to the first flow is between about 1:1 to about 1:2000.

21. The electrospray source of claim 13 wherein the flow rate of the second portion is between about 10 nL/min to about 25 μL/min per emitter.

22. The electrospray source of claim 13 wherein the pressure of the pressurized waste reservoir is between about 2 psi and about 50 psi.

* * * * *